INVENTORS
DONOVAN C. DAVIS
PAUL M. BROWN
BY
ATTORNEY

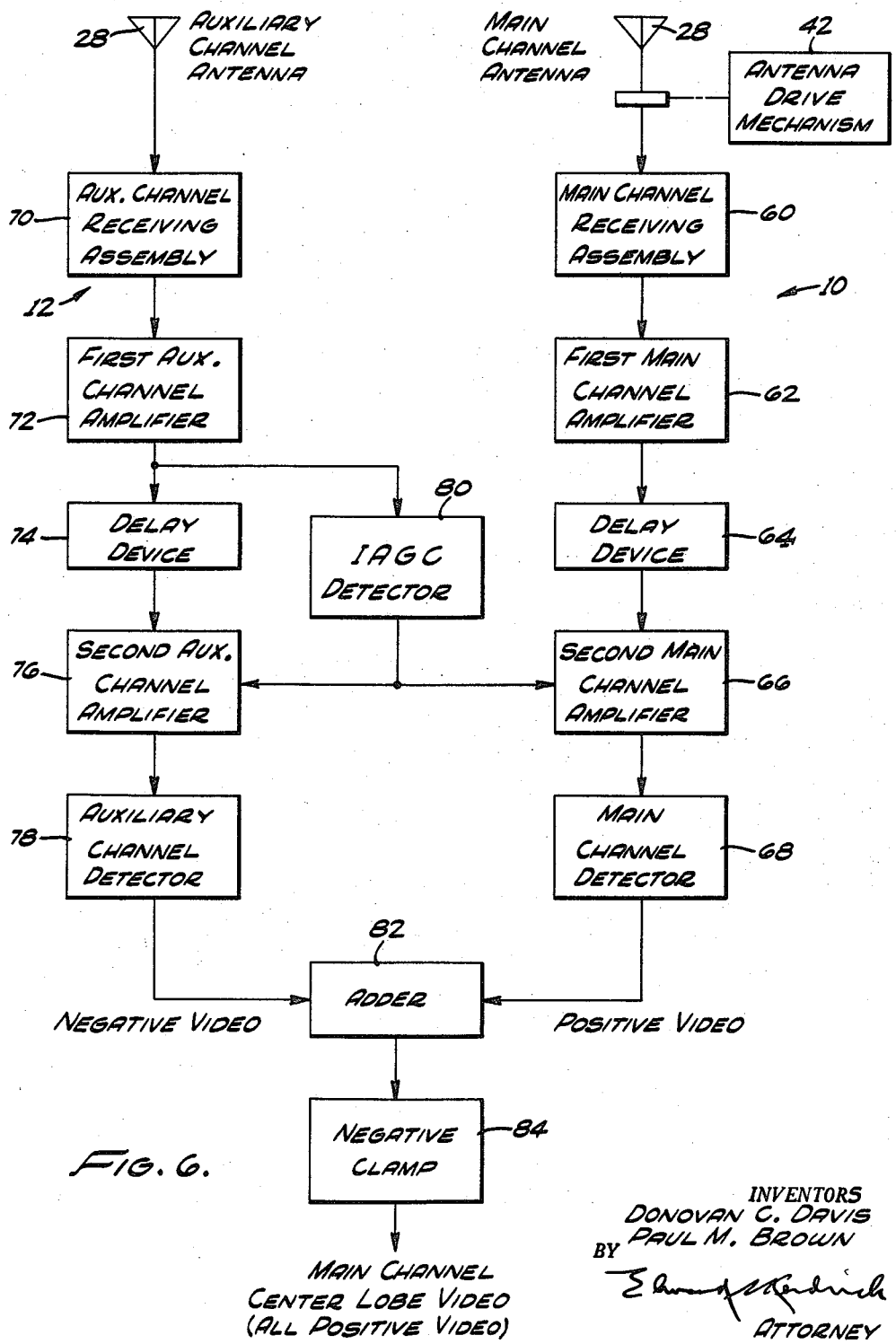

United States Patent Office 2,938,206
Patented May 24, 1960

2,938,206

RADIANT ENERGY RECEIVER SYSTEM

Donovan C. Davis, Pasadena, and Paul M. Brown, East Whittier, Calif., assignors to Gilfillan Bros., Inc., Los Angeles, Calif., a corporation of California Filed July 2, 1956, Ser. No. 596,131

26 Claims. (Cl. 343—113)

This invention relates to direction finding receivers, and more particularly to means for determining the angular position of a source of radiant energy.

Conventional direction finding receiver systems generally incorporate a direction finding receiver which may be mechanically and/or electronically tuned to intercept the frequency of a radiant energy source. Such a system may also generally include a directional antenna and means to rotate it, for example, in azimuth. It is also generally necessary to employ automatic gain control in a direction finding receiver to make it sensitive both to extremely low and extremely high received signal power without saturating or burning up its receiving tubes. This is especially true in countermeasures applications. However, any directional antenna used in such an applicatiton will generally have side lobes in addition to a main or principal lobe. This means that with automatic gain control, signals received through the side lobes will have receiver output amplitudes equal to those received through the main lobe. Thus, the receiver may present false position indications of a radiant energy source.

The system of the present invention overcomes this problem and other disadvantages of the prior art by providing an auxiliary receiving channel to complement a main receiving channel which may be conventional. The main receiving channel may comprise the conventional direction finding receiver and a directional antenna having means to rotate it. The auxiliary receiving channel may comprise simply means to reduce the amplitude of a signal received by the main receiving channel in an amount proportional to the signal power received by the auxiliary receiving channel. This means that if an auxiliary channel antenna is provided in the auxiliary receiving channel having a pattern identical to the main channel directional antenna, i.e. except for the directional antenna main lobe, reception through the directional antenna side lobes may be entirely suppressed.

Many times it may be impractical to design an auxiliary channel antenna to have a pattern substantially identical with the directional antenna except for its main lobe. However, in accordance with the invention, an omnidirectional antenna is usefully employed. In this case, the respective gains of the main and auxiliary receiving channels are adjusted in such a manner as to suppress the directional antenna side lobes. Effective or overall gain of the main receiving channel in the direction of the main lobe is reduced in this case, but side lobe suppression is effectively produced.

According to a feature of the invention automatic gain control (AGC) or instantaneous automatic gain control (IAGC) is accomplished simultaneously with side lobe suppression. In this embodiment of the invention, an auxiliary channel amplifier is provided in the auxiliary receiving channel and a main channel amplifier is provided in the main receiving channel. Preferably a delay device is connected in the main receiving channel ahead of the main channel amplifier to effect IAGC. An IAGC detector is then connected from the auxiliary channel amplifier to impress an inverse bias on the main channel amplifier. Thus, instantaneous automatic gain control may be accomplished and signal received through the side lobes of the directional antenna may be simultaneously suppressed if the gain of the auxiliary channel amplifier is adjusted to a sufficiently high value.

In order to prevent unnecessary suppression of signals of low power received through the main lobe of the directional antenna, preferably a variable mu tube is incorporated in the main channel amplifier and the input signal versus gain characteristic of the auxiliary channel amplifier, which may be, for example, a logarithmic characteristic, is adjusted to match the variable bias versus gain characteristic of the main channel amplifier.

In another embodiment of the invention, substantially constant gain amplifiers may be used in both the main and auxiliary channel amplifiers. The output of the auxiliary channel amplifier is then passed through a second auxiliary channel amplifier on which the IAGC bias is also impressed. The outputs of the second auxiliary and the main channel amplifiers are then detected and subtracted to suppress all video received through the side lobes of the directional antenna.

As stated previously, although an omni-directional auxiliary channel antenna may be effectively employed to suppress side lobe video, this method of side lobe suppression is accompanied by a reduction in sensitivity to signals received through the main lobe of the main channel antenna. In accordance with one aspect of the invention, the side lobes of the directional antenna are suppressed without a substantial reduction in the sensitivity of the main receiving channel to such signals. This is accomplished by employing an auxiliary channel antenna having a cardioid type of pattern with its symmetrical axis in line with the axis of the main lobe of the directional antenna. Thus, if the cusp of the cardioid pattern is positioned at the main lobe of the directional antenna, no substantial reduction in receiver sensitivity to signals received in the direction of the main lobe will result.

It is therefore an object of the invention to provide means to suppress signals received through the side lobes of a directional antenna.

It is another object of the invention to provide means to suppress signals received through the side lobes of a directional antenna in a direction finding receiver system utilizing automatic gain control.

It is still another object of the invention to provide means both to suppress signals received through the side lobes of the directional antenna and to provide automatic gain control in a direction finding receiver system employing the directional antenna.

It is a further object of the invention to provide means both to suppress signals received through the side lobes of a directional antenna without reducing receiver sensitivity and, simultaneously, to provide instantaneous automatic gain control in a direction finding receiver system employing the directional antenna.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Fig. 6 is a block diagram of still another embodiment of the invention.

Figure 1:
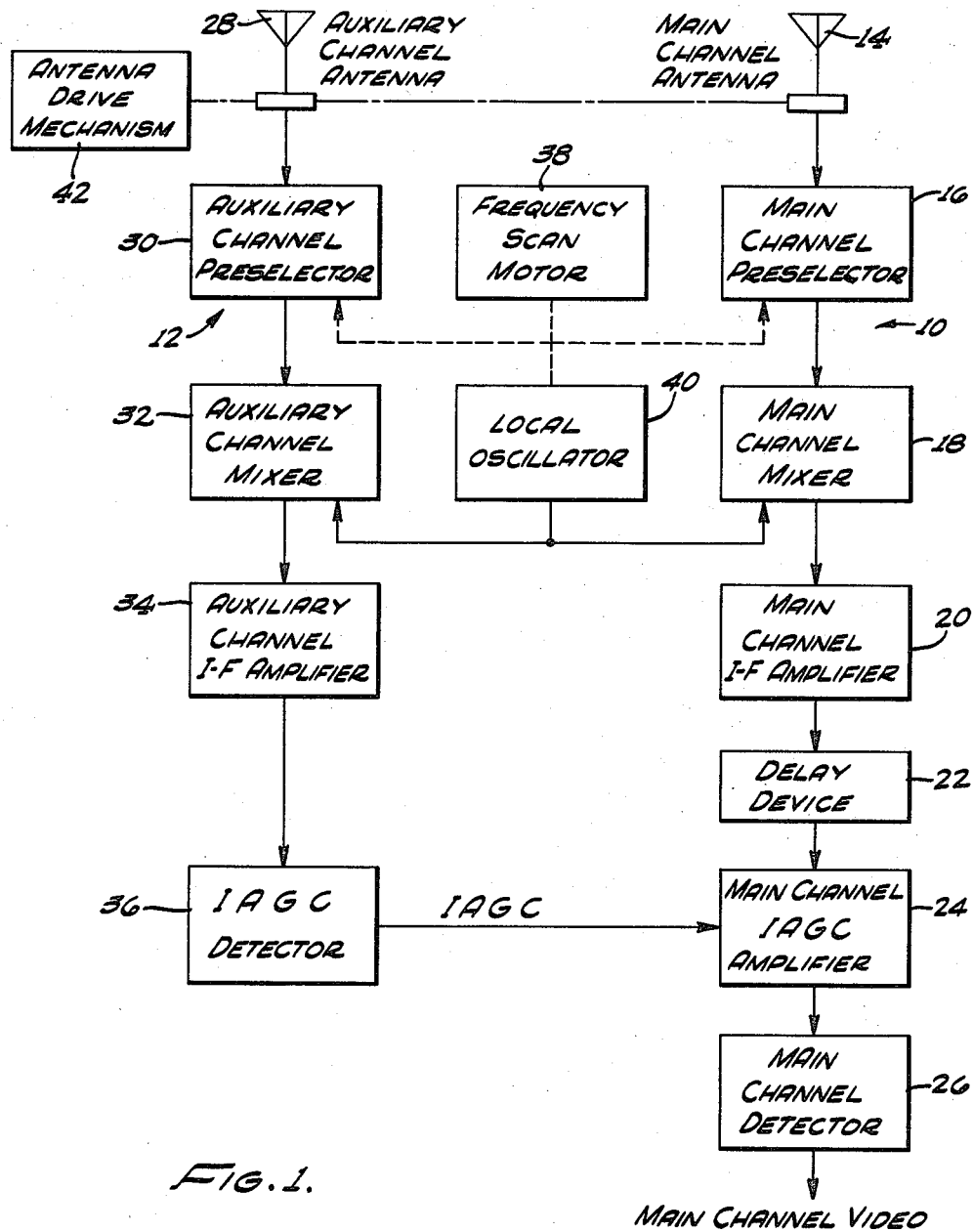
Fig. 1 is a block diagram of one embodiment of the invention.

In the drawings, in Fig. 1 main and auxiliary receiving channels 10 and 12 are shown. The main receiving channel 10 comprises a main channel antenna 14 which is a directional antenna, a main channel preselector 16, a main channel mixer 18, an auxiliary channel intermediate frequency (I.-F.) amplifier 20, a delay device 22, a main channel IAGC amplifier 24, and a main channel detector 26.

The auxiliary receiving channel 12 is similarly provided with an auxiliary channel antenna 28 which may have an antenna pattern as will be described hereinafter, an auxiliary channel preselector 30, an auxiliary channel mixer 32, an auxiliary channel I.-F. amplifier 34, and an IAGC detector 36, the output of which is employed to impress a negative bias on the main channel IAGC amplifier 24.

A frequency scan motor 38 is employed to mechanically tune the main and auxiliary channel preselectors 16 and 30. The frequency scan motor is also employed to mechanically tune a local oscillator 40, the output of which is impressed upon main and auxiliary channel mixers 18 and 32.

Preferably an antenna drive mechanism 42 is provided to rotate both the main and auxiliary channels 14 and 28 synchronously. This is due to the preferred antenna pattern which may be employed for the auxiliary channel antenna 28.

Figure 2:
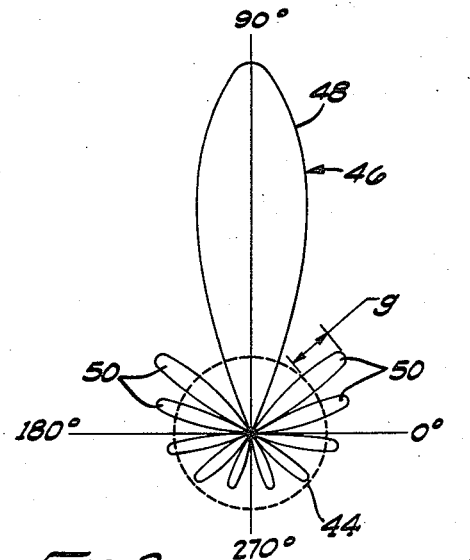
Figs. 2 and 3 are graphs of antenna patterns typical of the antennas employed in each of the main and auxiliary receiving channels shown in Fig. 1.

Before explaining the function of the invention as shown in Fig. 1, it will be desirable to examine more closely the patterns of the main and auxiliary channel antennas 14 and 28. The auxiliary channel antenna 28 may be an omni-directional antenna and have a pattern in a polar diagram form as illustrated at 44 in Fig. 2. The main channel antenna 14 may have a pattern as illustrated at 46 including a high gain main or principal lobe 48 and a plurality of low gain or side lobes 50. It is to be noted that if the gains of the main and auxiliary receiving channels 10 and 12 were equal, the video outputs of both the main and auxiliary receiving channels 10 and 12 could be subtracted to minimize the effects of signals received through the side lobes of the main channel antenna 14.

Figure 3:
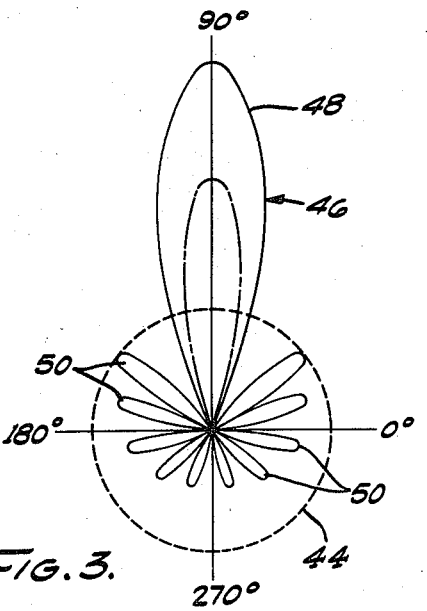

Alternatively, the gain of the auxiliary receiving channel 12 may be increased to make the effective antenna patterns of each of the receiving channels 10 and 12 to be as indicated at 44 and 46 in Fig. 3.

Figure 4:
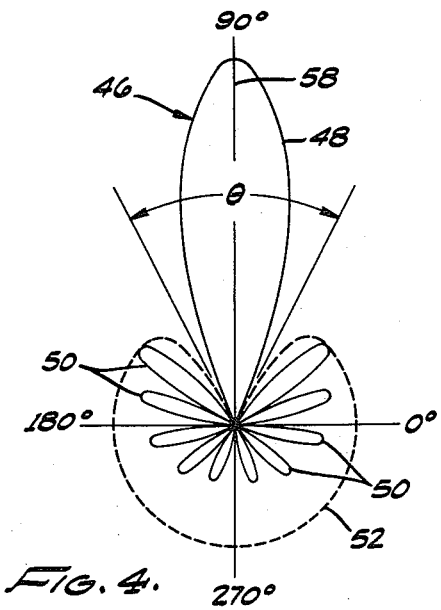
Fig. 4 is a diagram of a preferred antenna pattern for an auxiliary channel antenna shown in Fig. 1.
Figure 5:
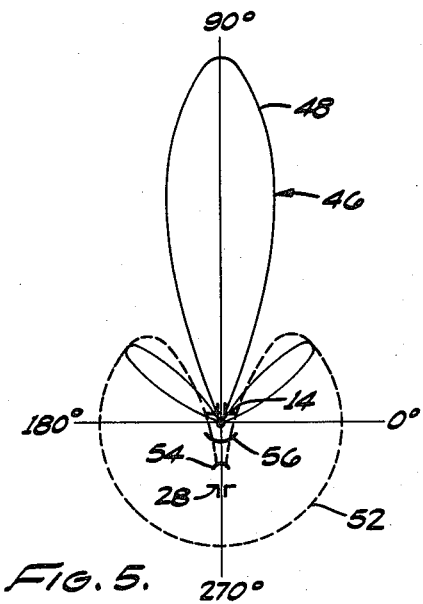
Fig. 5 is a schematic diagram of the antennas, reflectors, and patterns produced thereby according to a preferred embodiment of the invention.

It is to be noted that the pattern 44 of the auxiliary channel antenna 28 overlaps at least a portion of the main lobe 48 of the main channel antenna in either Fig. 3 or Fig. 4. If any subtraction is made between the output signals of the main and auxiliary receiving channels 10 or 12, or if the gain of the main channel is made an inverse function of the magnitude of signals received through the auxiliary channel 28, the effective gain of the main receiving channel 10 will be reduced in the direction of the main lobe 48 or the main channel antenna 14. For this reason, an auxiliary channel antenna pattern 52, as shown in Fig. 4, is preferred. This is a cardioid type pattern and may be produced in a number of ways, for example, with a small reflector 54 shown schematically in Fig. 5. A parabolic disc reflector 56 may also be employed with the main channel antenna 14 as there shown with the auxiliary channel antenna 28.

As stated previously, the antenna drive mechanism 42 is employed to rotate the main channel antenna 14 to search for sources of radiant energy. Although it is unnecessary to employ the frequency scan motor 38 and the local oscillator 40 with the main and auxiliary channel mixers 32 to determine the frequency of a radiating source, in countermeasures applications this is also desirable. What is most important is the fact that when the auxiliary channel antenna 28 has an omni-directional pattern such as the pattern 44 shown in Figs. 2 and 3, the auxiliary channel antenna 28 need not be rotated synchronously with the main channel antenna 14. However, when the auxiliary channel antenna 28 has the pattern 52, the fact that it is unsymmetrical means that in order to accomplish the purpose for which the particular shape of the pattern 52 was designed, the main and auxiliary channel antennas 14 and 28 must be rotated synchronously so that an axis 58 through the main lobe 48 of the main channel antenna 14 will be in line with the cusp of the cardioid type pattern 52 and the gain of the main receiving channel 10 in the direction of the main lobe 48 of the main channel antenna 14 will not be effectively reduced although the signals received through the side lobes 50 of the main channel antenna 14 may be suppressed.

In the operation of the direction finding receiver system shown in Fig. 1, the frequency scan motor 38, by tuning both the main and auxiliary channel preselectors 16 and 30 and varying the local oscillator inputs to the main and auxiliary channel mixers 18 and 32, will cause each channel to scan a selected frequency band to determine at what frequency an external source, if any, is radiating-wave energy. The outputs of the main and auxiliary channel mixers 18 and 32 are amplified respectively by the main and auxiliary channel I.-F. amplifiers 20 and 34 respectively. The output of the auxiliary channel I.-F. amplifier 34 is detected by the IAGC detector 36 which impresses an inverse or negative bias on the main channel IAGC amplifier 24. The delay device 22 is inserted between the main channel I.-F. amplifier 20 and the main channel IAGC amplifier 24 to provide a small necessary electronic delay for the IAGC voltage produced by the IAGC detector 36 to control the gain of the main channel IAGC amplifier 24. Preferably the main channel IAGC amplifier 24 includes a variable mu tube, i.e. a tube having a variable bias versus gain characteristic. Preferably the auxiliary channel I.-F. amplifier 34 has a logarithmic input versus gain characteristic and is provided with operating voltages and currents such that this characteristic matches the variable bias versus gain characteristic of the main channel IAGC amplifier 24. Thus the gain of the main channel IAGC amplifier 24 may be a linear function of the strength of input signals received through the auxiliary channel antenna 28. Then, if the gain of the auxiliary receiving channel 12 is adjusted to an appropriate value, the IAGC bias developed by the IAGC detector 36 may be sufficiently high to suppress any signals received in the direction of the side lobes of the main channel antenna 14.

If the antenna drive mechanism 42 is employed to rotate the main and auxiliary channel antennas 14 and 28 synchronously and the auxiliary channel antenna 28 has the pattern 52 as illustrated in Fig. 4, it will be seen that side lobe suppression may be accomplished without loss of gain in the main receiving channel 10. The main channel detector 26 then detects the output of the main channel IAGC amplifier 24 to produce main channel video which may be utilized in several ways, e.g. it may be incorporated in some type of visual display.

It is to be noted that, as stated previously, an instantaneous automatic gain control in addition to the suppression of the side lobes of the main channel antenna 14 is effected by the use of the system shown in Fig. 1. This gain control is effected through the use of the IAGC detector 36 which not only reduces the gain of main channel IAGC amplifier 24 in accordance with the magnitude of the signals received through the auxiliary channel antenna 28, but also according to the position of a radiating source with respect to the axis of the auxiliary channel antenna 28.

Before leaving Fig. 1, it may be pertinent to note that ideally, the auxiliary channel antenna 28 should have a waveform exactly identical with all the side lobes 50 of the main channel antenna 14, but having zero gain in the direction of the main lobe 48. Structure to accomplish this purpose would be, of course, difficult if not impossible to design. Hence, if the gain of the auxiliary channel antenna 28 is zero through the angle $\theta$ of the main lobe 48, the necessary function of the auxiliary channel antenna 28 is performed effectively. In order to accomplish this any number of reflectors similar to the reflector 54 shown in Fig. 5 may be employed with appropriate size, configuration and spacing from not only the auxiliary channel antenna 28 but also from the reflector 56 of the main channel antenna 14.

As stated previously, the antenna drive mechanism 42 need not be employed to rotate the auxiliary channel antenna 28 at all. This situation is diagrammatically expressed in Fig. 6 where the auxiliary channel antenna 28 is not connected to the antenna drive mechanism 42. The main and auxiliary receiving channels 10 and 12 have been somewhat modified for the embodiment of the invention shown in Fig. 6. The main receiving channel 10 in this embodiment of the invention comprises a main channel receiving assembly 60, a first main channel amplifier 62, a delay device 64, a second main channel amplifier 66, and a main channel detector 68. The auxiliary receiving channel comprises an auxiliary channel receiving assembly 70, a first auxiliary channel amplifier 72, a delay device 74, a second auxiliary channel amplifier 76, and an auxiliary channel detector 78. An IAGC detector 80 is also incorporated in the auxiliary receiving channel 12 to impress an IAGC bias similar to the bias supplied by the IAGC detector 36 shown in Fig. 1 on not only the second main channel amplifier 66 but also upon the second auxiliary channel amplifier 76. The delay devices 64 and 74 in each of the main and auxiliary receiving channels 10 and 12 are employed to delay the outputs of the first main and auxiliary channel amplifiers 62 and 72 a sufficient length of time to permit the bias output of IAGC detector 80 to control the outputs of second main and auxiliary channel amplifiers 66 and 76 inversely according to the amplitude of signals received through the auxiliary channel antenna 28.

The main channel detector 68 is preferably a positive video detector and the auxiliary channel detector 78 is preferably a negative video detector. Hence, with the use of the main and auxiliary channel detectors 68 and 78, an adder 82 may be employed to add the outputs thereof to perform an effective subtraction of the signals from each of the main and auxiliary receiving channels 10 and 12. A negative clamp 84 may be connected from the output of the adder 82 to clamp the negative video signals from the auxiliary channel detector 78 exceeding the positive video signals from the main channel detector 68 to zero or ground. The output of the negative clamp 68 thus is positive center lobe video of the main channel antenna 28, which may be employed in any desired manner. However, it will be obvious that a negative voltage, when applied to the intensity grid of a cathode-ray tube indicator could do no damage. Hence, for many applications the clamp 84 may be unnecessary.

It will be obvious to those skilled in the art that many other changes and modifications of the invention may be made without departing from the true scope thereof as defined in the appended claims.

What is claimed is:

1. A system for determining the angular position of a source of radiant energy, said system comprising: main and auxiliary receiving channels, a directional antenna in said main receiving channel having a relatively high gain in at least one lobe, a first delay device in said main receiving channel for delaying signals received through said directional antenna, a main channel amplifier in said main receiving channel for amplifying said delayed signals, an auxiliary channel amplifier in said auxiliary receiving channel, and gain control means in said auxiliary receiving channel responsive to signals received by said auxiliary channel antenna for decreasing the effective gain of signals amplified by said main channel amplifier.

2. The invention as defined in claim 1, wherein said gain control means includes a first auxiliary channel amplifier and an instantaneous automatic gain control detector responsive to the output of said first auxiliary channel amplifier for impressing an inverse instantaneous automatic gain control bias on said main channel amplifier.

3. The invention as defined in claim 2, wherein said main channel amplifier has a variable bias versus gain characteristic, and said first auxiliary channel amplifier has an input signal versus gain characteristic matched with the variable bias versus gain characteristic of said main channel amplifier to reduce the output of said main channel amplifier substantially to zero for signals received in a direction other than that of the main lobe of said main channel antenna.

4. The invention as defined in claim 2, wherein a second delay device is connected from said first auxiliary channel amplifier and a second auxiliary channel amplifier is connected from said second delay device, the output of said instantaneous automatic gain control detector also being impressed upon said second auxiliary channel amplifier, and wherein additional means are provided to subtract the outputs of said receiving channels.

5. A system for determining the angular position of a source of radiant energy, said system comprising: main and auxiliary receiving channels, a directional antenna in said main receiving channel having a relatively high gain in at least one lobe, a first delay device in said main receiving channel for delaying signals received through said directional antenna, a main channel amplifier in said main receiving channel for amplifying said delayed signals, a first auxiliary channel amplifier in said auxiliary receiving channel, an instantaneous automatic gain control detector responsive to the output of said first auxiliary channel amplifier for impressing an instantaneous automatic gain control bias on said main channel amplifier, a second delay device connected from said first auxiliary channel amplifier, a second auxiliary channel amplifier connected from said second delay device, the output of said instantaneous automatic gain control detector also being impressed upon said second auxiliary channel amplifier, a negative video detector connected from said second auxiliary channel amplifier, a positive video detector connected from said main channel amplifier, and means for adding the outputs of said video detectors.

6. A system for determining the angular position of a source of radiant energy, said system comprising: main and auxiliary receiving channels, a directional antenna in said main receiving channel having a relatively high gain in at least one lobe, an auxiliary channel antenna in said auxiliary receiving channel having a gain in the direction of said one lobe at least no larger than its gain in any other direction, and means in said auxiliary receiving channel responsive to the amplitude of a signal received through said auxiliary channel antenna for reducing proportionately the output signal amplitude of said main receiving channel.

7. The invention as defined in claim 6, wherein means are additionally provided to rotate at least said main channel antenna.

8. The invention as defined in claim 6, wherein the gain of said auxiliary channel antenna in the direction of said one lobe is less than its gain in any other direction.

9. The invention as defined in claim 8, wherein means are additionally provided to rotate both said main and auxiliary channel antennas synchronously.

10. A system for determining the angular position of a source of radiant energy, said system comprising: main and auxiliary receiving channels, a directional antenna in said main receiving channel having a relatively high gain in at least one lobe, a first delay device in said main receiving channel for delaying signals received through said directional antenna, a main channel amplifier in said main receiving channel for amplifying said delayed signals, a first auxiliary channel amplifier in said auxiliary receiving channel, an auxiliary channel antenna in said auxiliary receiving channel having a gain in the direction of said one lobe at least no larger than its gain in any other direction, and an instantaneous automatic gain control detector responsive to the output of said first auxiliary channel amplifier for introducing an inverse instantaneous automatic gain control bias on said main channel amplifier.

11. The invention as defined in claim 10, wherein means are additionally provided to rotate at least said main channel antennas.

12. The invention as defined in claim 10, wherein the gain of said auxiliary channel antenna in the direction of said one lobe is less than its gain in any other direction.

13. The invention as defined in claim 12, wherein means are additionally provided to rotate both said main and auxiliary channel antennas synchronously.

14. A system for determining the angular position of a source of radiant energy, said system comprising: main and auxiliary receiving channels, a directional antenna in said main receiving channel having a relatively high gain in at least one lobe, an auxiliary channel antenna in said auxiliary receiving channel having a gain in a direction of said one lobe less than its gain in any other direction, means to rotate both said main and auxiliary channel antennas synchronously, a first delay device in said main receiving channel for delaying signals received through said directional antenna, a main channel amplifier in said main receiving channel for amplifying said delayed signals, an auxiliary channel amplifier in said auxiliary receiving channel, and an instantaneous automatic gain control detector responsive to the output of said auxiliary channel amplifier for impressing a negative instantaneous automatic gain control bias on said main channel amplifier, said main channel amplifier having a variable bias versus gain characteristic, said auxiliary channel amplifier having an input signal versus gain characteristic matched with the variable bias versus gain characteristic of said main channel amplifier to reduce the output of said main channel amplifier substantially to zero for signals received in a direction other than that of the main lobe of said main channel antenna.

15. A system for determining the angular position of a source of radiant energy, said system comprising: main and auxiliary receiving channels, a directional antenna in said main receiving channel having a relatively high gain in at least one lobe, a first delay device in said main receiving channel for delaying signals received through said directional antenna, a main channel amplifier in said main receiving channel for amplifying said delayed signals, a first auxiliary channel amplifier in said auxiliary receiving channel, an instantaneous automatic gain control detector responsive to the output of said first auxiliary channel amplifier for impressing a negative instantaneous automatic gain control bias on said main channel amplifier, a second delay device connected from said first auxiliary channel amplifier, a second auxiliary channel amplifier connected from said second delay device, the output of said instantaneous automatic gain control detector also being impressed upon said second auxiliary channel amplifier, and means to subtract the outputs of said receiving channels.

16. The invention as defined in claim 15, wherein said means for subtracting the outputs of said receiving channels comprise: a negative video detector connected from said second auxiliary channel amplifier, a positive video detector connected from said main channel amplifier, and means to add the outputs of said video detectors.

17. A system for determining the angular position of a source of radiant energy, said system comprising: main and auxiliary receiving channels; a directional antenna in said main receiving channel having a relatively high gain in at least one lobe; an auxiliary channel antenna in said auxiliary receiving channel having a gain in the direction of said one lobe less than its gain in any other direction; and means in said auxiliary receiving channel responsive to the amplitude of a signal received through said auxiliary channel antenna for reducing proportionately the output signal amplitude of said main receiving channel.

18. The invention as defined in claim 17, wherein means are additionally provided to rotate both said main and auxiliary channel antennas at the same angular rate.

19. The invention as defined in claim 18, wherein the pattern of said auxiliary channel antenna is cardioid in shape.

20. A system for determining the angular position of a source of radiant energy, said system comprising: main and auxiliary receiving channels; a directional antenna in said main receiving channel having a single main lobe of a relatively high gain and a plurality of side lobes of lower corresponding gains; an auxiliary channel antenna in said auxiliary receiving channel having a gain in the direction of all of said side lobes as large as that of said directional antenna in the direction of said side lobes; and means in said auxiliary receiving channel responsive to the amplitude of a signal received through said auxiliary channel antenna for reducing proportionately the output signal amplitude of said main receiving channel.

21. A system for determining the angular position of a source of radiant energy, said system comprising: main and auxiliary receiving channels; a directional antenna in said main receiving channel having a single relatively high gain main lobe and a plurality of side lobes; an auxiliary channel antenna in said auxiliary receiving channel having a substantial gain in the direction of said side lobes; a auxiliary channel amplifier in said auxiliary receiving channel for amplifying signals received by said auxiliary channel antenna; and a variable gain amplifier in said main receiving channel responsive to the output of said auxiliary channel amplifier for amplifying signals received by said directional antenna, the gain of said variable gain amplifier being reduced in proportion to signal strength in said auxiliary receiving channel, whereby side lobes of said directional antenna may be suppressed.

22. The invention as defined in claim 21, wherein said auxiliary channel amplifier has an input signal versus gain characteristic matched with the variable bias versus gain characteristic of said variable gain amplifier to reduce the output signal of said main channel amplifier substantially to zero for signals received in a direction other than that of the main lobe of said directional antenna.

23. A radiant energy detection system comprising: main and auxiliary receiving channels; a directional antenna in said main channel having a relatively high gain main lobe and relatively low gain side lobes; an auxiliary antenna in said auxiliary receiving channel, the ratio of the auxiliary antenna gain in the direction of said main lobe to the auxiliary antenna gain in the direction of said side lobes being less than the ratio of said directional antenna gain in the direction of said main lobe to the directional antenna gain in the direction of said side lobes; and automatic gain control means to reduce the gain of said main channel in accordance with the output signal magnitude of said auxiliary channel.

24. The invention as defined in claim 23, wherein the pattern of said auxiliary antenna is omnidirectional.

25. The invention as defined in claim 23, wherein the pattern of said auxiliary antenna is cardioid in shape.

26. A radiant energy detection system comprising: main and auxiliary receiving channels; a directional antenna in said main channel having a relatively high gain main lobe and relatively low gain side lobes; an auxiliary antenna in said auxiliary receiving channel, the ratio of the auxiliary antenna gain in the direction of said main lobe to the auxiliary antenna gain in the direction of said said lobes being less than the ratio of said directional antenna gain in the direction of said main lobe to the directional antenna gain in the direction of said side lobes; and instantaneous automatic gain control means to suppress the output signal of said main channel when the output signal of said auxiliary channel is of a relatively large magnitude.

References Cited in the file of this patent

UNITED STATES PATENTS

| | | |
|---|---|---|
| 1,916,358 | Bruce | July 4, 1933 |
| 2,026,254 | Sandfort | Dec. 31, 1935 |
| 2,061,737 | Offenhauser | Nov. 24, 1936 |
| 2,062,906 | Hooven | Dec. 1, 1936 |
| 2,279,466 | Johnske | Apr. 14, 1942 |
| 2,825,900 | Collbohm | Mar. 4, 1958 |

UNITED STATES PATENT OFFICE
CERTIFICATE OF CORRECTION

Patent No. 2,938,206                           May 24, 1960

Donovan C. Davis et al.

It is hereby certified that error appears in the printed specification of the above numbered patent requiring correction and that the said Letters Patent should read as corrected below.

Column 2, line 4, for "signal" read -- signals --; column 3, line 33, for "channels" read -- channel antennas --; line 63, after "channel" insert -- antenna --; line 65, for "or the" read -- of the --; column 4, line 30, for "radiating-wave" read -- radiating wave --; column 8, line 40, for "a auxiliary" read -- an auxiliary --.

Signed and sealed this 1st day of November 1960.

(SEAL)
Attest:

KARL H. AXLINE                                         ROBERT C. WATSON
Attesting Officer                                      Commissioner of Patents